Nov. 10, 1953    W. H. OGDEN    2,658,987
COMBINED ELECTRIC AND GAS OPERATED RANGE OR STOVE
Filed April 20, 1949    2 Sheets-Sheet 1
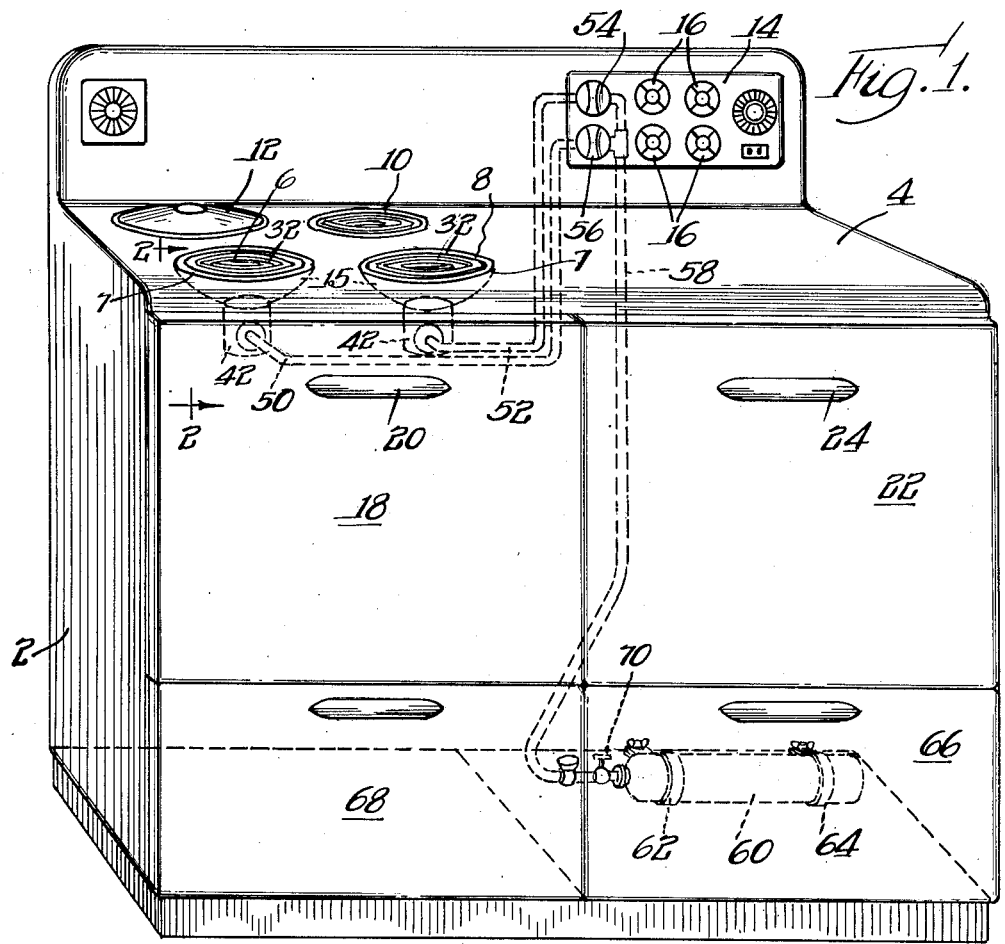
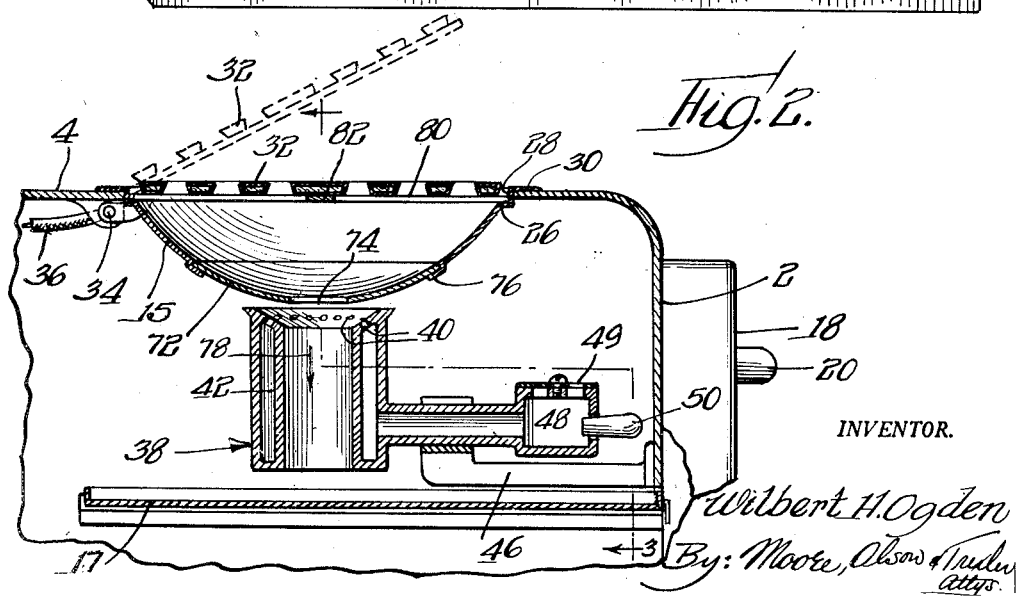
INVENTOR.
Wilbert H. Ogden
By: Moore, Olson & Trexler
attys.

Nov. 10, 1953 W. H. OGDEN 2,658,987
COMBINED ELECTRIC AND GAS OPERATED RANGE OR STOVE
Filed April 20, 1949 2 Sheets-Sheet 2
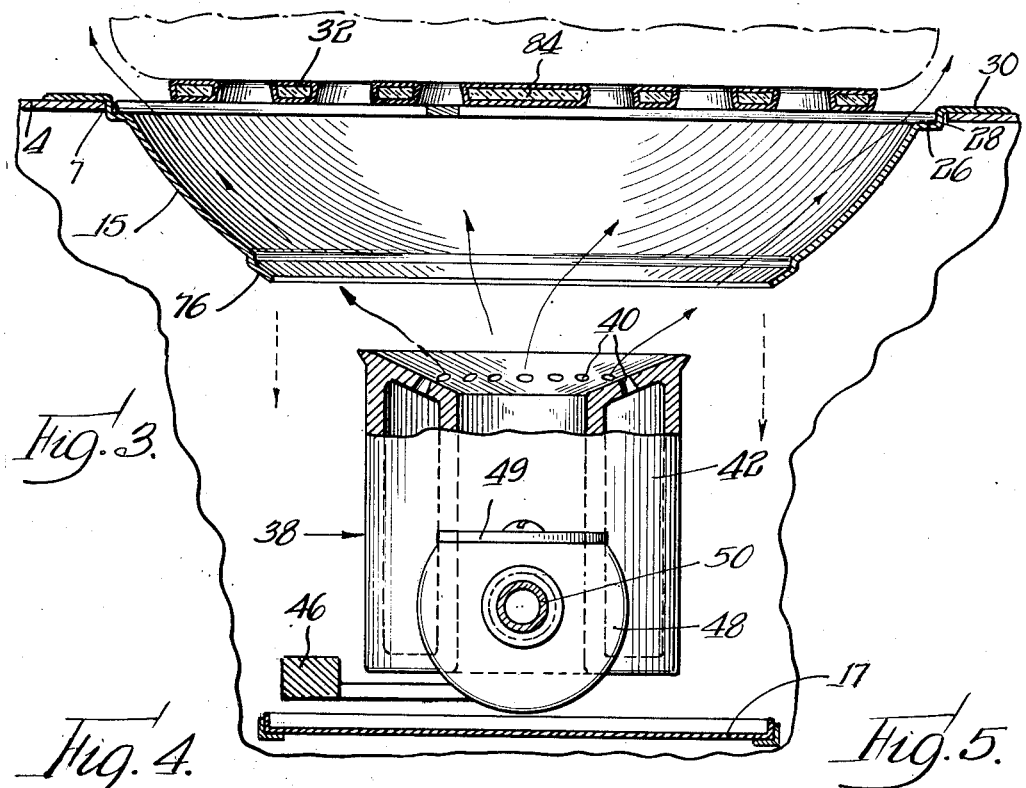
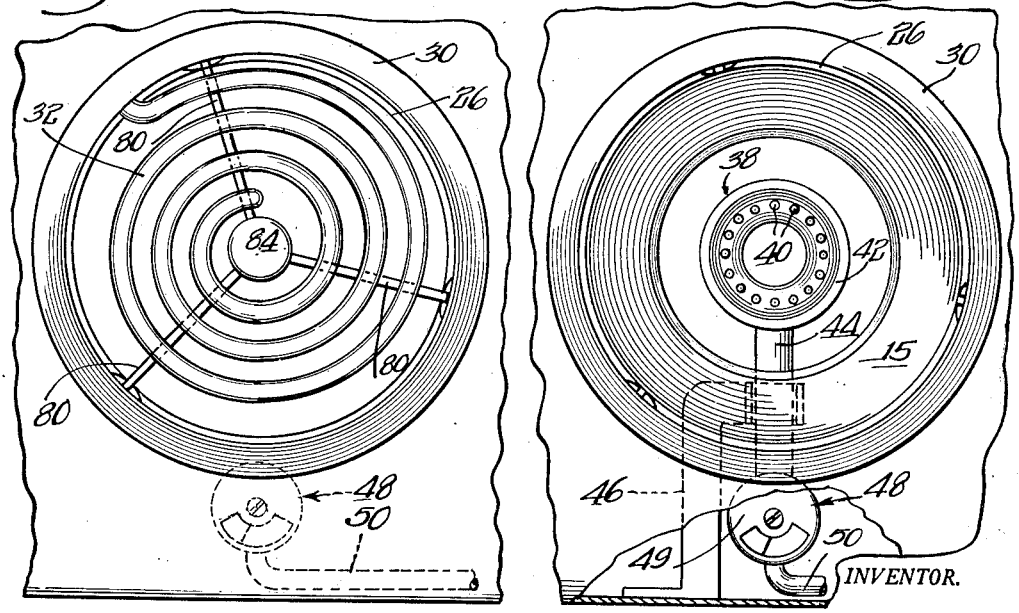
INVENTOR.
Wilbert H. Ogden
By: Moore Olson & Trexler
attys.

Patented Nov. 10, 1953

2,658,987

UNITED STATES PATENT OFFICE 2,658,987

COMBINED ELECTRIC AND GAS OPERATED RANGE OR STOVE

Wilbert H. Ogden, Fort Myers, Fla.

Application April 20, 1949, Serial No. 88,567

12 Claims. (Cl. 219—37)

This invention relates to a range or stove primarily designed for cooking and in general follows the present day construction of electric and gas cooking ranges. By the term "cooking range" is meant a range which although essentially adaptable for cooking is likewise adaptable for heating flatirons, water, or any other medium to be heated.

In the use of the modern type of electric ranges or stoves power failures and shutdowns, particularly in rural areas, are frequent; in southern states in particular, hurricanes and vicious storms compel the power companies to disconnect the source of electrical supply temporarily for human safety. At times this disconnection will extend as much as several days. In northern areas power lines are subject to being broken because of heavy loads of sleet and ice collecting on them. Urban and rural areas are subject to breakdowns in the power plants, and in rural areas particularly the breakdowns are effected either from the main division or due to intentional or accidental breakage in insulators and vandalism. The emergency standby plants in most cities are not sufficient to carry the loads of both city and rural areas and therefore the rural areas are the ones disconnected because the cities require their emergency loads for hospital and other emergency requirements.

The object of the present invention is to provide a primarily electric cooking or heating range or stove or other instrumentality which is likewise provided with means which may be shifted to a gas operation in the event of failure of the electric power source; and by the same token, if desired the invention is adaptable so that the gas and the electric power source may be simultaneously used as a source of heat if desired although such an operation is not one normally that would be necessary. However in cases where the power source, although not completely failing, becomes diminished to such an extent as to provide only a small amount of heat from the electrical source, this diminished electrical heating effect may be augmented by simultaneously used gaseous heating effect. Hence the two sources of heat supply, while preferably usable independently, may if desired be used simultaneously.

Among the objects, therefore, of the present invention is to provide an electric range, stove, or heating device with an additional power failure heating unit herein shown as a gas burner means.

Another object of the invention resides in providing an electric range or stove having one or more electric sources of heat for cooking or heating or otherwise, and wherein such stove is provided with an additional source of heat in the form of one or more gas burners which are arranged in a concealed manner but are operable immediately upon failure of power or diminution of power, as hereinbefore explained.

Yet another object of the invention resides in providing an electric range, stove, or other heating device of the preferably, although not necessarily, conventional construction and wherein the same is provided with one or more gas burners which are arranged so that they are not observable when the range or stove is used with electricity as the source of heat but which are immediately operable upon failure or diminution of the electric current as a source of heat supply.

Yet another object of the present invention is to provide an electric range or stove or heating device which is provided with one or more concealed gas heating burners operably associated with the usual electric heating elements so that upon electrical power failure the source of gaseous heat may be utilized in lieu of the electrical source of heat.

Yet another object of the invention resides in providing an electric range or stove having concealed heating devices which are alternative to the electric heating devices and more specifically to provide an electric range or stove having gas heating units disposed in conjunction with the electric heating units for alternate use on failure of the electric power source.

Yet another object of the invention resides in providing in association with the electrical heating units of an electric range or stove and upon which electrical heating units the utensils, pans, or devices to be heated are supported, one or more alternative or gaseous heating means for supplying a source of heat other than electrically operated heat and which other source of heat is positioned to be operative upon the object to be heated as it is supported upon the aforesaid electric heating unit.

Yet another object of the invention resides in providing in a range or stove for heating or cooking purposes an electrically operated heating unit adapted to support the object to be heated, in combination with a gaseous heating burner disposed to operate through the electrical heating unit to heat the device to be heated as it is supported upon said electrical heating unit.

Yet another object of the invention resides in providing an electrically operated heating range or stove with means whereby it may be very simply and economically transformed into a combined gas heating and electric heating range or stove with minimum changes and whereby such transformation may be provided in a range or stove originally made or as an attachment to such an electric range already manufactured and ready for use.

Yet another object of the invention resides in providing a concealed gas burner for an electric range wherein the dish-shaped pan located immediately below the sealed electric unit, such for illustration as the present type monotube sealed unit or any other type of electric unit, is constructed and arranged so that a portion thereof which normally hides the gaseous burner underlying the same may be removed and whereby the flame from the gaseous burner will pass upwardly through the electric heating unit to heat the device or cooking utensil superimposed upon the electric heating unit as, for instance, when an electric power failure occurs.

Yet another object of the invention resides in arranging the dish-like drip bowl which underlies the monotube sealed electric unit or other unit of an electric range or stove and which directs the liquid overflow from the pan or boiler resting upon the heating unit properly downwardly centrally of the drip bowl onto the drip pan, with a central removable portion which when in position normally hides an underlying gaseous burner but which central portion when removed permits operation of the gaseous burner upwardly through the electrical heating unit upon which the object to be heated is supported, and wherein likewise said removable portion when in normal position, as when the electrical heating unit is used, will direct such overflowing liquid downwardly centrally through the gas burner into the drip pan without causing the overflowing liquid to clog or flood the gas burner.

Yet another object of the invention resides in providing an electric range or stove with an alternative source of heat, preferably in the form of one or more gaseous burners which can be alternatively operated by suitable valve means and wherein particularly the source of gaseous heat is detachably carried by the stove whereby the gas tank may be replaced when exhausted or whereby an electric range or stove may be readily fortified with a gas heating attachment.

Another object of the invention resides in providing a divided drip bowl for an electric range or cooking stove having all of the present day advantages for use in connection with an electric cooking or heating range and which also is adapted for use in combination with a gaseous burner disposed in spaced relation from and below the electric heating unit so that the drip bowl may be used alternatively to hide the gas burner and direct overflowing liquid being heated directly down therethrough without flooding the gaseous burner and whereby the portion of the drip bowl in situ may be utilized when the gas burner is to be utilized as an alternative or simultaneous source of heat.

Yet another object of the invention resides in providing an electric range or heating stove with a divided drip pan having a removable center for use in association with a gas burner disposed immediately below the electric heating unit of the stove or range and immediately below the divided drip pan, the central portion of the divided drip pan being removable to permit use of the gas burner on failure of a power source.

Another object of the invention resides in providing in association with an electric range or stove and the conventional type of electric heating unit wherein portions of the electric heating unit are spaced apart or provided with spacings therebetween for the passage of overflow fluid from the container supported on the upper surface of said electric heating unit to pass downwardly therethrough, an associated dished or other shaped pan disposed below the electric unit and constructed and arranged to direct downwardly onto an underlying drip pan those heated liquids in the containers which overflow during heating as a result of the heating effect, the provision of a gaseous burner disposed below and centrally of said dished pan and arranged upon removal of the removable central portion of said dished pan, to direct gaseous flame upwardly through and around the outer periphery of said electric heating unit onto the supported undersurface and upper side walls of said pan, boiler or other element supported on the electric heater to be heated whereby during normal use of the electric heating unit the replaced central portion of said dished pan operates normally not only to hide the gaseous burner but also to direct overflowing fluids downwardly centrally of the gaseous burner without flooding the same or alternatively whereby upon failure of power source and removal of the central portion of said dished pan, the burner may actuate as a source of heat upwardly through the electric heating unit and whereby any overflow liquids will be directed downwardly peripherally and in spaced relation from the gaseous burner and without flooding the same.

Another object of the invention resides in providing a combined electric and gas operated cooking or heating stove or range wherein a gas burner is disposed thereon below the electric heating unit upon which the object to be heated, such for instance as a pan or other container having liquid therein to be heated, and wherein the dished pan directly underlying the electric unit is provided with a removable section of greater cross section than the horizontal cross section of the gaseous burner and whereby the gaseous burner is disposed so that when the gas burner is not in use and the electric heating element is used as a source of heat, overflowing liquid is directed downwardly by means of the central portion of the dished pan downwardly through the center of the gaseous burner without flooding the same, and alternatively whereby upon failure of electric power the gaseous burner is used and the central portion of the dished pan is removed, overflow liquid is directed downwardly peripherally and in spaced relation from the gaseous burner and without flooding the same, and whereby the flame from the gaseous burner when used as a source of heat passes upwardly through and around the electric heating unit to heat the pan or other object supported upon said electric heating unit.

These and other objects of invention will be apparent from a perusal of the following specification when taken in connection with the accompanying drawings, wherein:

Figure 1 is a perspective view of an electric range or stove provided with a built-in alternate gaseous source of heat or whereby the same is provided with an attachment which may be added to an electric range or stove with minimum of changes and installation charges;

Figure 2 is a section taken on the line 2—2 of Figure 1;

Figure 3 is an enlarged section taken on the line 3—3 of Figure 2;

Figure 4 is a plan view showing the arrangement of the electric cooking and heating element; and Figure 5 is a plan view showing the arrangement of the gas cooking or heating burner.

Referring now to the drawings in detail, any type of electric range 2 may be utilized comprising the usual housing 2 of any desired shape. For purposes of illustration, but not by way of limitation, the invention is shown as adapted to the modern type of rectangular housing having on its upper surface 4 the front electric burners 6 and 8 and a rear electric burner 10 and the usual type of deep well cooking device 12. The invention is illustrated in connection with the front burners 6 and 8 although it will be understood that the invention is equally applicable to any arrangement of one or more electric heating units. In the illustrated embodiment the stove is provided with the usual type of front panel 14 with the electric control members 16 for the various electric heating units 6, 8, 10 and 12. In addition, any type of modern attachments, installations or other devices in association with the present type of electric ranges or stoves may be utilized.

The present invention broadly resides in providing an independent source of heat, non-electrical, associated with one or more of the electric heating units herein illustrated in association with the electric heating units 6 and 8. The arrangement is such that upon operation of suitable controls hereinafter disclosed, and particularly upon electrical power failure, the stove may be instantly converted into a gas heated range or stove, the source of gaseous heat operating upwardly through the electrical heating unit which supports the pan, boiler, flatiron, or other device to be heated. In addition, suitable control means and source of gaseous medium are provided for the stove, it being understood that the gaseous source of heat is operable upon failure of the power source as the heating medium.

In the present application I shall describe any type of electrical heating unit. By reference to Figures 2 and 3 it will be seen that the top surface 4 of the stove or range is provided with the usual opening 7 for the reception of a dished pan 15, the purpose of this dished pan being to direct any overflowing liquid contained in a cooking utensil supported upon the upper surface of the heating element, as hereinafter described, downwardly onto the usual type of drip pan 17 disposed in spaced relation considerably therebelow. This drip pan 17 is of a shallow flat nature and is removed through the front of the range or stove when the door 18 thereof is swung downwardly. It is understood that in one type of construction this door is hinged at its bottom and is swung downwardly when the handle 20 is grasped for swinging the same downwardly. The other door 22 is shown as provided with another handle 24. The compartments 18 and 22 are the usual oven compartments and include an electric burner as is well known in the art, or one of the compartments may be a storage compartment, as desired.

By again referring to Figure 3 it will be seen that the dished pan 15 is preferably provided at its upper surface with a peripheral horizontal shoulder 26 and in the present instance is preferably provided with an upward peripheral extension 28 terminating in a horizontal, outwardly extending rim or collar 30 which overlies the upper surface of the opening 7 in the top surface 4 of the stove. This collar 30, the extension 28, and preferably the portion 26, are chrome surfaced for neat appearance. If desired, the rim or ring 30 may be formed separately, or in fact any desired arrangement for supporting the dished portion 15 from the opening 7 in the stove may be available. The electric heating unit 32 may be of any desired construction. In the modern type of electric ranges or stoves it is formed as a horizontal grid having one or more heating units arranged in spaced circular or coil formation so as to provide a horizontal pan or object or boiler supporting surface located above the top surface of the rim 30 whereby when a pan, boiler, coffee pot, flatiron, or other object to be heated, is placed in heating position thereon such object to be heated will be spaced from and removed sufficiently from the upper surface of the stove 4 which is preferably of enamel finish and hence the enamel will not be cracked or impaired by the heat imparted to the object resting upon the electric heating unit or grid. Hence in the present type of stove, as constructed, the electric heating unit or grid also comprises a means for supporting the object to be heated, such as the pan or boiler or flatiron or what not, during the heating period. It is within the contemplation of this invention, in the event that the upper surface of the stove is not made of enamel but is made of a material which will not crack, to arrange the upper portion of the stove so that it may aid the electrical heating unit in supporting the pan. Preferably, however, it is desirable to have the electric heating unit or grid as the sole support for the object to be heated, such for instance as a pan or boiler, so that the heat from the electric unit may thus flow up and around the lower peripheral surface of the boiler and thereby more quickly impart heat thereto. In short, with the upper surface of the electrical heating grid disposed above the upper surface of the rim 30 and the upper surface 4 of the stove, the heating effect will not only pass through the spaces between the various sections of the grid but also will flow upwardly around the outermost section of the grid and upwardly and around the pan where the pan completely overlies the electric heating grid.

In the heretofore constructions of these dished drip bowls or pans 15 the same have been made in one piece except for a central opening whereby liquid contained in the pans, boilers, coffee pots or what not being heated would flow downwardly over the sides of the pan or pots, downwardly across the inner surface of the drip bowl 15 and would be directed downwardly centrally onto the underlying shallow drip pan 17, or would be directed downwardly through and between the spacings between the grid portions of the electric heating unit and downwardly through the central, relatively smaller opening of the drip bowl 15 into the drip pan.

In prior constructions the electrical heating unit 32 has been installed so that it could be removable or semi-removable so that the drip bowl might be taken out and cleaned. For instance, in one type of range on the market, the electrical heating unit such as 32 is hinged as at 34 so that it can be swung upwardly as shown in Figure 2, sufficiently for the dished drip bowl 15 to be removed. The electrical heating unit was heated by means of electrical connectors 36 running to the control members 16 on the panel 14, the terminals of which were connected to a source of electric energy in the housing from a plug-in connection, as is well known.

The present invention resides in the provision and arrangement of preferably a gaseous burner of any desired type such as the illustrated burner 38, disposed in spaced relation such for instance as two and one-half inches, more or less, such dimension being illustrative and not by way of limitation, under the electric heating unit. This gas burner, as shown in Figures 2 and 3, is provided with a preferably circular series of burner holes 40 and with the gas distributing chamber 42 and a conduit 44 connecting therewith. There is the usual type of bracket 46 for supporting the burner in this position and the usual type of adjustable air mixing valve 48 which is shown as provided with the gasous pipe 50, each burner having such a pipe and each running to a control valve 54 and 56 on the front panel 14. A gas pipe 58 runs from each valve 54 and 56 downwardly to a replaceable gas tank 60. This gas tank is replaceably held as at 62 and 64 within and adjacent the bottom of the housing 2 and below and to the rear of one of the front drawers 66, the other drawer being 68, whereby it is not only out of the way but whereby the tank may be replaced by pulling out the drawer 66. A manual control valve 70 connects the tank 60 with the gas conduit line 58. It will thus be seen that there are two manual control valves in each line from the gas conduit to either of the burners. Obviously, one or more burners may be used and where a plurality of burners are used the number of control valves on the panel 14 is accordingly varied. By having the control valve 70 at the tank as a separate control from the control valves 54 and 56 when the control valve 70 is closed, any possibility of ignition of the gas by use of the electric burner when the gas is not being used is completely avoided. In addition the controls 54 and 56 serve as means for preventing any ignition of the gas upon use of electricity for the range or stove. The mixing chamber 48 is provided with the usual type of adjustable valve plate 49 for modifying the air content or the composition of the gaseous mixture as is well known in the art.

Means is provided in association with the electric heating unit, such for illustration as the monotube sealed electric heating unit herein shown and the gas burner 38 disposed therebelow, for normally hiding a gas burner when not in use and for also causing overflow fluids to pass harmlessly down centrally of the gas burner when the gas burner is not in use and when the cooking is done by means of the electric unit and likewise when the gas burner is in use and the electric burner inoperative, for permitting the flame of the gas burner to pass upwardly through the electric heating grid or unit 32 and in such a manner that overflow liquids will be deflected downwardly around and out of contact with the gaseous burner so that the same will not be flooded either when in use or when not in use and whereby such overflow liquids will be directed onto the underlying shallow drip pan 17.

To this end the usual type of drip bowl 15 is provided with a removable central portion 72 as shown in Figure 2. This central portion in turn is provided with the central opening 74. The central portion of the periphery of the removable section 72 rests upon a dished peripheral lip 76 formed on the inner peripheral portion of the dished bowl 15 so that the central portion 72 may rest freely therein and when in such position forms a continuation of the inner upper surface of the bowl 15 and is arranged liquid-tight so that the overflow liquid will be directed downwardly across the upper surface 72 of the inner section and downwardly through the central opening 74 thereof downwardly centrally of the burner, as shown by the arrow 78 in Figure 2. It will thus be seen that this removable central portion 72 of the divided drip bowl 15 normally hides the gaseous burner when the divided portion 72 is in position. This is the electrical heating unit position of the device.

The electric unit itself is preferably supported by a spider 80 of any desired construction preferably fixed as at 82 to the underside of the central portion 84 of the heating unit. In Figure 4 the spider 80 is shown as provided with three radially extending arms which are adapted to lie upon the shoulder portions 26 of the rim 30 or of the bowl 15 when the bowl is formed integrally with the shoulder and with the rim 30 as herein preferably shown. Thus the electrical heating unit 32 is supported by the spider in heating position but by reason of the pivoted or other type of connection may be shifted to a position such that the dished bowl may be removed for cleaning or may be cleaned in situ, and also permits the central portion 72 of the dished bowl to be removed to permit alternate operation of the stove with the gaseous burner as the source of heat instead of the electric heating element. So also by removal of the dished bowl division or portion 72, the electric burner is exposed for cleaning, or if desired, the entire drip bowl 15 may be removed for cleaning and access to the burner.

It will be understood from the foregoing that the invention is not limited to the type of electric heating unit used nor is it limited to the specific type of gaseous burner used, nor is the invention limited to the exact arrangement or disposition of the gaseous burner with respect to the electric burner but it is preferred that the gaseous burner be arranged such that the flames thereof will pass upwardly through the interstices or spaces between the grid elements of the electric heating unit upon which the cooking utensil or other object to be heated is supported upon the horizontal surface of the electric heating grid and in a manner such that the flame from the gaseous burner will pass upwardly to all portions of the grid as well as around the periphery of the grid quickly to heat the entire body of the pan, boiler, pot or other utensil to be heated and it is also important with respect to the arrangement of the divided drip bowl so that during the operation of the electric heater as a source of heat the overflow liquid will be directed downwardly through the central opening 74 of the removable portion 72 of the drip bowl and thence downwardly through the central portion of the gaseous burner without flooding the same into the drip pan, and alternatively when the electric grid is inoperative and the gaseous burner is in operation the removed section 72 of the drip bowl will permit the overflow liquids to be directed downwardly around and in spaced relation from the burner openings 40 so that the gaseous flame will not be extinguished. It will be noted that when the removable section of the drip bowl is in position as shown in Figure 2 the gaseous burner is completely hidden and except for the control members 54 and 56 on the panel it would not be apparent that the electric stove carries any additional source of heating medium such as the gas burners 38. It will also be apparent that by reason of the arrangement herein disclosed, any type of modern electric range or stove may be very quickly and easily and economically provided with a gaseous burner attachment as it involves merely altering the drip bowl pan, installing any type of burner therebelow in the manner disclosed or any similar equivalent manner, and in providing the panel 14 or an extension panel therefor with the additional valve control means such as 54 and 56, the piping connections 52 and 58 and the gaseous container 60 with the control valve 70, all as herein described.

The monotube sealed unit or electric heating grid being made of heat resistant material provides a means for supporting the pan, coffee pot, boiler or cooking utensil or other device to be heated during the heating or cooking operation, and likewise by reason of its construction and disposition is not injured by the passage of the gas flame therethrough despite the fact that the gas flame will render the heat resisting metal red hot under gas heating conditions.

It is apparent that many widely different embodiments of this invention may be made without departing from the spirit and scope thereof, and therefore it is not intended to be limited except as indicated in the appended claims.

Having thus described the invention, what I claim as new and desire to secure by Letters Patent is:

1. An electrical heating range or stove comprising a housing having an opening in its top surface, an electrical heating unit grid mounted in said opening and having a horizontally disposed surface for supporting a utensil during heating, a gas burner disposed below said electrical heating unit grid, means for electrically heating said electrical heating unit grid, gaseous connections for supplying said gas burner with gaseous heating medium to be burned by said burner for heating the utensil supported on said electrical heating grid, and removable means interposed between said electric heating unit and said gas burner for concealing the presence of said gas burner when said electric heating unit grid is to be used as a source of heating medium for said stove.

2. An electric heating range or stove having an electric heating unit having spaced apart heat transmitting portions, a gas burner disposed below said heating unit and arranged so that the heat of said gas burner passes upwardly through the apertures between the spaced portions of said electric heating unit to heat the device supported thereon, means for controlling the heating effect of said electric heating unit and independent means for controlling the heating effect of said gas burner, and an overflow drip bowl disposed below said electric heating unit and provided with a removable portion centrally thereof, said removable portion when in normal position serving to conceal the gas burner and when removed forming an aperture through which the flames of said gas burner pass upwardly through the apertures in said spaced apart heat transmitting portions of said electric heating unit.

3. An electric heating range or stove having an electric heating unit having spaced apart heat transmitting portions, a gas burner disposed below said heating unit and arranged so that the heat of said gas burner passes upwardly through the apertures defined by said spaced portions of said electric heating unit to heat the device supported thereon, means for controlling the heating effect of said electric heating unit and independent means for controlling the heating effect of said gas burner, an overflow drip bowl disposed below said electric heating unit and provided with a removable portion centrally thereof, said removable portion when in normal position serving to conceal the gas burner and when removed forming an aperture through which the flames of said gas burner pass upwardly through the apertures between said spaced apart heat transmitting portions of said electric heating unit, said removable portion of said drip bowl having a central aperture serving to pass overflow liquids centrally of said gas burner and away from the burner elements, and said drip bowl being constructed so that on removal of said removable portion said drip bowl will direct overflow liquids away from said gas burner.

4. In an electric range or stove including a housing having an upper heating surface provided with one or more openings and an electric unit with a grid disposed in each opening and forming a supporting surface for a utensil to be heated, a source of gas under pressure mounted within said housing, conduit means from said source, a gas burner mounted in said housing below the electric unit and in spaced relation therefrom, a mixing valve for said burner, said gaseous conduit means connecting to said mixing valve, said burner being disposed so that when ignited the flame thereof will be projected toward said electric heating unit to heat the cooking utensil supported thereon, a sectional drip bowl mounted in the horizontal opening of said stove about the periphery of said electric heating unit and extending downwardly toward said gas burner, said drip bowl having a central opening of larger cross section than a horizontal cross section through the burner, and a removable section for the opening in said drip bowl, said removable section when in position forming a concealing screen for said burner, said removable central section having a central liquid escaping opening disposed centrally of said burner and said burner having a central opening removed from the burner outlets and through which the escape liquid from the opening in said removable drip bowl section may pass.

5. In an electric stove having a top section provided with an opening, a ring-like member around said opening supporting a dished drip bowl, a spider supported in association with said dished drip bowl, an electrically operated heating unit supported by said spider and forming a horizontal surface disposed above the surface of said ring-like member for supporting a utensil to be heated, said drip bowl having a central opening, a removable section normally closing said opening, the junction between said sections being substantially liquid-tight, said removable section having a central opening, a gas burner disposed immediately below said electric heating unit and below the central opening of said drip bowl and in registration with the central opening thereof, the cross section of the opening in said drip bowl being greater than the horizontal cross section of said burner, said burner having a vertical opening therethrough, said removable section of said drip bowl having a central opening registering with the central opening of said burner, said burner having burner openings disposed outwardly of said central opening, a gas tank mounted within said stove housing and having gaseous connections to the control means on the panel, and valve means in said gaseous connection for opening and closing the passage of gas from said tank to said gaseous burner.

6. An electrical heating range comprising a housing having an opening in its top surface, an electrical heating unit mounted in said opening and having a horizontally disposed surface for supporting a utensil to be heated, a gas burner disposed below said electrical heating unit, a deflecting element disposed between said electrical heating unit and said gas burner, said deflecting element having a removable central portion of greater cross section than the cross section of said gas burner, said removable portion and said gas burner having registering central openings therein whereby said removable portion is adapted to deflect materials centrally downwardly through said gas burner and away from the gas apertures of said gas burner, the peripheral edges of the non-removed portions of said deflecting elements being arranged to deflect material downwardly away from the gas apertures of said gas burner when the removable portion is removed.

7. A removable drip pan for a heating range comprising a substantially dish-shaped body portion extending a substantial distance under an associated burner, a supporting flange formed on the upper edge of said body portion, said body portion having a centrally disposed aperture therein, a peripheral lip formed on said body portion and surrounding said aperture, and a second dish-shaped portion adapted to be supported by said lip and to substantially close said aperture, said second dish-shaped portion having a centrally disposed aperture formed therein.

8. In a stove including an electrical heating unit and a gas burner disposed below said electrical heating unit, a deflecting element disposed between said electrical heating unit and said gas burner and extending a substantial distance inwardly under said electrical heating unit, said deflecting element having a centrally disposed aperture formed therein, a removable member adapted to close said aperture and having a greater cross section than the cross section of said gas burner, said removable portion and said gas burner having registering central openings formed therein, said removable member being adapted to deflect material centrally downwardly through said gas burner and away from the gas apertures of said gas burner, said removable member being adapted to conceal said gas burner from sight when in position upon said deflecting element, and the portion of said deflecting element surrounding the aperture therein being arranged to deflect material downwardly away from the gas apertures of said gas burner when the removable member is removed.

9. A stove comprising an electrical heating unit providing a heating surface for supporting an object to be heated thereby, said electrical heating unit having a plurality of apertures disposed throughout the body thereof and extending therethrough, and a gas burner disposed below said electrical heating unit, said gas burner having burner openings therein, certain of said burner openings being positioned so that the flame and heat from said gas burner passes upwardly through the apertures in said electrical heating unit over substantially the entire surface thereof whereby to heat the object supported on said electrical heating unit.

10. A stove comprising an electrical heating unit providing a heating surface for supporting an object to be heated thereby, and a gas burner disposed below said electrical heating unit and adapted to heat objects supported on said electrical heating unit, portions of said electrical heating unit overlying said gas burner, said gas burner having an enlarged central aperture extending therethrough to provide a passage for material falling thereon.

11. A stove comprising an electrical heating unit, means for supporting an object to be heated thereby, a gas burner disposed below said electrical heating unit, portions of said electrical heating unit overlying said gas burner, and means disposed between said electrical heating unit and said gas burner for directing spilled material away from the gas openings in said gas burner when said electrical heating unit is being used, said directing means including a central removable portion, the peripheral edges of the non-removed portions of said directing means being arranged to direct material downwardly away from said gas burner upon removal of said removable portion.

12. A stove comprising an electrical heating unit providing a heating surface for supporting an object to be heated thereby, said heating unit having a plurality of apertures disposed throughout the body portion thereof and extending therethrough, a gas burner disposed below said electrical heating unit, portions of said electrical heating unit overlying said gas burner, said gas burner having burner openings therein, certain of said burner openings being positioned so that the flame from said certain burner openings passes through the apertures in said electrical heating unit to heat an object supported on said electrical heating unit, and a deflecting element disposed between said electric heating unit and said gas burner, said deflecting element having an aperture therein, the peripheral edges of said deflecting element defining the aperture in said deflecting element being arranged to deflect materials away from the burner openings in said gas burner.

WILBERT H. OGDEN.

References Cited in the file of this patent

UNITED STATES PATENTS

| Number | Name | Date |
|---|---|---|
| 919,843 | Fish | Apr. 27, 1909 |
| 1,652,292 | Armstrong | Dec. 13, 1927 |
| 1,716,329 | Simpson | June 4, 1929 |
| 2,269,349 | Tullis | Jan. 6, 1942 |
| 2,384,262 | Rutan | Sept. 4, 1945 |
| 2,413,478 | Wiegand | Dec. 31, 1946 |
| 2,506,554 | Tuttle | May 2, 1950 |
| 2,525,062 | Berg | Oct. 10, 1950 |

FOREIGN PATENTS

| Number | Country | Date |
|---|---|---|
| 200,394 | Great Britain | July 12, 1923 |
| 774,427 | France | Dec. 6, 1934 |